United States Patent [19]
Bahr

[11] Patent Number: 4,953,993
[45] Date of Patent: Sep. 4, 1990

[54] CAGED COMB FOR A LARGE ROLLER BEARING

[75] Inventor: Diethelm Bahr, Wermelskirchen, Fed. Rep. of Germany

[73] Assignee: Hoesch AG, Dortmund, Fed. Rep. of Germany

[21] Appl. No.: 378,247

[22] Filed: Jul. 11, 1989

[30] Foreign Application Priority Data

Jul. 16, 1988 [DE] Fed. Rep. of Germany ....... 3824279

[51] Int. Cl.$^5$ ............................................. F16C 33/49
[52] U.S. Cl. .................................... 384/623; 384/608
[58] Field of Search ............... 384/593, 604, 608, 614, 384/618-623

[56] References Cited

U.S. PATENT DOCUMENTS

| | | | |
|---|---|---|---|
| 449,961 | 4/1891 | Simonds | 384/614 X |
| 625,021 | 5/1899 | Cooper | 384/619 |
| 639,775 | 12/1899 | Rogers | 384/621 |
| 1,239,547 | 9/1917 | Webb | 384/608 X |
| 2,117,633 | 5/1938 | Smith | 384/623 |
| 2,539,683 | 1/1951 | Ablett | 384/623 X |
| 2,959,458 | 11/1960 | Kaye | 384/608 |
| 3,091,501 | 5/1963 | Satrum | 384/608 X |
| 3,328,098 | 6/1967 | Budzich | 384/620 X |
| 4,413,866 | 11/1983 | Geisey | 384/623 X |

*Primary Examiner*—Thomas R. Hannon
*Attorney, Agent, or Firm*—Max Fogiel

[57] ABSTRACT

A comb-caged thrust bearing in which a circular-shaped ring or circular-shaped segments are provided for an axial two-row roller race that carries rollers in a large centrally-open roller bearing. The ring or segments form a web with radially oppositely-lying comb stages for holding and guiding the rollers. These comb stages of the web enclose the rollers along three sides of the rollers. Two of those enclosed sides are along oppositely-lying axial lines on the periphery of the rollers. The third enclosed side corresponds to one end of the roller and along a diameter thereof. This diameter has ends connected to the oppositely-lying axial lines on the periphery of the rollers. The other end of the rollers is left free and is not enclosed by the comb stages.

12 Claims, 1 Drawing Sheet

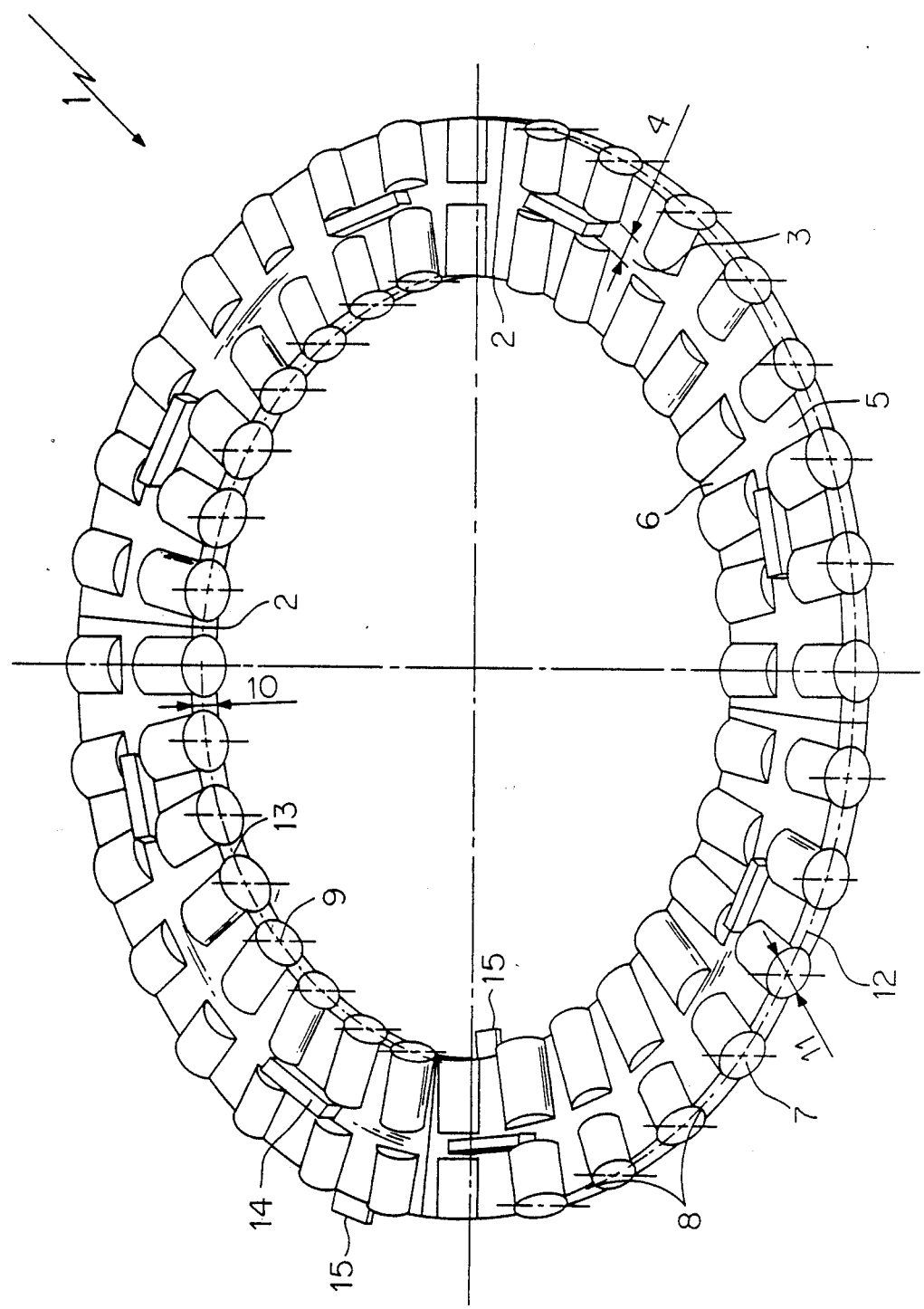

CAGED COMB FOR A LARGE ROLLER BEARING

The invention concerns a thrust separator as recited in the preamble to claim 1.

Thrust separators of this type are employed to position the rollers on the race and to prevent them from interacting.

The use of thrust separators to secure axial races with two rows of rollers is known from German GM No. 1 989 631. Webs are secured to one side of the complete or partial ring that is the main section of the separator, and position both rows of rollers. The height of such thrust separators is determined by sliding structures. One drawback of the design is that the webs are very long and must be comparatively thick in order to withstand the applied forces. Separators with closed pockets like those described in German Patent No. 2 242 432 are frequently employed to avoid this drawback but entail another in that they take up a lot of space radially. The same drawback is involved in the use of two independently acting thrust separators as described in German OS No. 1 575 425.

The object of the present invention is accordingly to provide a thrust separator of the aforesaid type that will reliably position the rollers while consisting of as little material as possible.

This object is attained by the characteristics recited in the body of claim 1. Advantageous embodiments of the invention are recited in the bodies of the subsidiary claims.

The particular advantage of the invention is that the rollers are individually positioned. The difference in the speed of rotation of rollers with a different diameter will not result in friction on and boring into the mutually contacting faces of adjacent rollers. Another advantage is that the separator will, although it is made of little material, securely position the rollers. Again, the slenderness of the separator's webs provides space for a large number of rollers, which has a positive effect on the bearing's load capacity. If the surfaces of the webs that face the surface of the rollers is concave at approximately the level of the axis of rotation of the rollers, the separator will advantageously be positioned by the rollers themselves and will not need to rest against the race, additionally eliminating friction.

BRIEF SUMMARY OF THE DRAWING

One embodiment of the invention will now be described with reference to the drawing which shows the thrust separator.

DETAILED DESCRIPTION OF THE DRAWING

A thrust separator 1 consists of four annular segments 2. Distributed along both edges of the mid-region 3, also in the shape of an annular segment of uniform width 4, of annular segments 2 are radially opposed webs 5 and 6. The webs have concave surfaces 8 that enclose rollers 7 at approximately the same level as their axis 9. This design allows rollers 7 themselves to position and support separator 1 in that the height 10 of the separator is shorter than the diameter 11 of the rollers.

In the illustrated embodiment, webs 5 are as long as rollers 7 although this is not essential to the function. Distributed axially along each side of the mid-region 3 of annular segments 2 are positioners 14. The height 10 of separator 1 and positioners 14 together is less than the diameter 11 of rollers 7. The function of positioners 14 is to prevent the total surface of separator 1 from resting against the race once the rollers have been worn down after long use, which would destroy the film of lubrication. In accordance with another characteristic of the invention, positioners 15 that project radially beyond rollers 7 are distributed along the outside diameter 12 and/or the inside diameter 13.

Thrust separator 1 is manufactured by known methods. When it is made of a casting material, it is directly cast. It can also be manufactured by non-machined shaping, forging for example, or the pockets that accommodate rollers 7 can be machined out of a ring or annular segment 2.

I claim:

1. A comb-caged thrust bearing comprising circular-shaped segments for an axial two-row roller race carrying rollers in a large centrally-open roller bearing; said segments forming a web with radially oppositely-lying comb stages for holding and guiding said rollers; said comb stages of said web enclosing said rollers along three sides of said rollers, said rollers being enclosed by said comb stages along oppositely-lying axial lines on the periphery of said rollers, said rollers having one end enclosed by said comb stages substantially along a diameter of said one end of said rollers, said diameter having ends connected to said axial lines, said rollers having another end that is free from being enclosed by said comb stages.

2. A thrust bearing as defined in claim 1, wherein said comb stages of said web have concave surfaces where said comb stages enclose said rollers along said oppositely lying axial lines.

3. A thrust bearing as defined in claim 1, including positioner elements distributed axially along at least one side of said segments, said web and said positioning elements having a combined height that is less than the diameter of said rollers.

4. A thrust bearing as defined in claim 1, including positioning elements projecting radially beyond said rollers and being distributed along an outside diameter of said web.

5. A thrust bearing as defined in claim 1, including positioning elements projecting radially beyond said rollers and being distributed along an inside diameter of said segments.

6. A comb-caged thrust bearing comprising circular-shaped segments for an axial two-row roller race carrying rollers in a large centrally-open roller bearing; said segments forming a web with radially oppositely-lying comb stages for holding and guiding said rollers; said comb stages of said web enclosing said rollers along three sides of said rollers, said rollers being enclosed by said comb stages along oppositely-lying axial lines on the periphery of said rollers, said rollers having one end enclosed by said comb stages substantially along a diameter of said one end of said rollers, said diameter having ends connected to said axial lines, said rollers having another end that is free from being enclosed by said comb stages; said comb stages of said web having concave surfaces where said comb stages enclose said rollers along said oppositely-lying axial lines, said comb stages accommodating said rollers at substantially a level corresponding to the axes of said rollers; first positioning elements distributed axially along at least one side of said segments, said web and said first positioning elements having a combined height that is less than the diameter of said rollers; second positioning elements projecting radially beyond said rollers and being distributed along an outside diameter and an inside diameter of said segments.

7. A comb-caged thrust bearing comprising a circular-shaped ring for an axial two-row roller race carrying rollers in a large centrally-open roller bearing; said ring forming a web with radially oppositely-lying comb stages for holding and guiding said rollers; said comb stages of said web enclosing said rollers along three sides of said rollers, said rollers being enclosed by said comb stages along oppositely-lying axial lines on the periphery of said rollers, said rollers having one end enclosed by said comb stages substantially along a diameter of said one end of said rollers, said diameter having end connected to said axial lines, said rollers having another end that is free from being enclosed by said comb stages.

8. A thrust bearing as defined in claim 7, wherein said comb stages have concave surfaces where said comb stages enclose said rollers along said oppositely-lying axial lines, said comb stages accommodating said rollers at substantially a level corresponding to the axes of said rollers.

9. A thrust bearing as defined in claim 7, including positioning elements distributed axially along at least one side of said ring, said web and said positioning elements having a combined height that is less than the diameter of said rollers.

10. A thrust bearing as defined in claim 7, including positioning elements projecting radially beyond said rollers and being distributed along an outside diameter of said ring.

11. A thrust bearing as defined in claim 7, including positioning elements projecting radially beyond said rollers and being distributed along an inside diameter of said ring.

12. A comb-caged thrust bearing comprising a circular-shaped ring for an axial two-row roller race carrying rollers in a large centrally-open roller bearing; said ring forming a web with radially oppositely-lying comb stages for holding and guiding said rollers; said comb stages of said web enclosing said rollers along three sides of said rollers, said rollers being enclosed by said comb stages along oppositely-lying axial lines on the periphery of said rollers, said rollers having one end enclosed by said comb stages substantially along a diameter of said one end of said rollers, said diameter having ends connected to said axial lines, said rollers having another end that is free from being enclosed by said comb stages; said comb stages having concave surfaces where said comb stages enclose said rollers along said oppositely-lying axial lines, said comb stages accommodating said rollers at substantially a level corresponding to the axes of said rollers; first positioning elements distributed axially along at least one side of said ring, said web and said first positioning elements having a combined height that is less than the diameter of said rollers; second positioning elements projecting radially beyond said rollers and being distributed along an outside diameter and an inside diameter of said ring.

* * * * *